United States Patent [19]

Bäbler

[11] Patent Number: 5,298,076
[45] Date of Patent: Mar. 29, 1994

[54] CARBAZOLE DIOXAZINE-PIGMENTED PLASTICS AND COATINGS

[75] Inventor: Fridolin Bäbler, Hockessin, Del.
[73] Assignee: Ciba-Geigy Corporation, Ardsley, N.Y.
[21] Appl. No.: 36,131
[22] Filed: Mar. 23, 1993
[51] Int. Cl.$^5$ ................................. C08K 5/16
[52] U.S. Cl. .................... 106/498; 106/493; 106/494; 524/90; 524/97
[58] Field of Search .............. 106/498, 493, 494; 524/90, 97; 523/440, 461, 503

[56] References Cited

U.S. PATENT DOCUMENTS

| | | | |
|---|---|---|---|
| 4,107,126 | 8/1978 | Burke, Jr. et al. | 260/38 |
| 4,253,839 | 3/1981 | Spietschka et al. | 106/498 |
| 4,785,999 | 11/1988 | Takijiri | 241/26 |
| 4,804,417 | 2/1989 | Fujita et al. | 106/498 |

OTHER PUBLICATIONS

Chem. Abst. 96(10): 70437d of JP 56141355, Nov. 1981.
Chem. Abst. 90(22): 170257q of DE 2,742,575 Feb. 1979.
Der. Abst. 83—32411k/14 of EP 075,182 Mar. 1983.
Derw. Abst. 83—10048k/05 of EP 069,895 Jan. 1983.
Chem. Abst. 100(4): 23563h of JP 58118855 Jul. 1983.
Chem. Abst. 95(22): 188640x of DE 3010949 Oct. 1981.
T. C. Patton, "Pigments Handbook", vol. 1, pp. 643–646 (1973).

Primary Examiner—Helene Klemanski
Assistant Examiner—C. M. Bonner
Attorney, Agent, or Firm—George R. Dohmann

[57] ABSTRACT

A process utilizing carbazole dioxazine crude, having a specific surface area of from 2 to 20 m$^2$/g and an average particle size of 0.5 to 20 μm, as a pigment to color high molecular weight organic materials is disclosed. The process is especially useful for producing multicolor effects and camouflage effects and for use in automotive coatings. Compositions containing the carbazole dioxazine crude and a high molecular weight organic material are also disclosed.

17 Claims, No Drawings

CARBAZOLE DIOXAZINE-PIGMENTED PLASTICS AND COATINGS

BRIEF DESCRIPTION OF THE INVENTION

A process for pigmenting high molecular weight organic materials which utilizes carbazole dioxazine crude to generate unique color effects. Compositions containing the carbazole dioxazine crude and a high molecular weight organic material.

BACKGROUND OF THE INVENTION

The dioxazine pigment class is well known for its strong bluish-red to violet colors. Due to its outstanding tinctorial strength and saturation and excellent heat and light resistance, carbazole dioxazine, C.I. Pigment Violet 23, became the most important dioxazine violet on the worldwide pigment market. In general, C.I. Pigment Violet 23 has a violet color, a particle size less than 0.5 μm and a specific surface area greater than about 25 $m^2/g$.

In general, carbazole dioxazine crude has a greenish color, a particle size greater than 0.5 μm and a specific surface area from about 2 to 20 $m^2/g$ and can be processed into C.I. Pigment Violet 23. Carbazole dioxazine crude can be prepared according to the process disclosed in JP 56141355 A2 (Chem. Abstr., 96(1):70437d).

It is known in the art to process carbazole dioxazine crude into C.I. Pigment Violet 23 by reducing its particle size. U.S. Pat. No. 4,785,999 describes the dry milling of polycyclic crude pigments. The German patent, DE 2,742,575 describes the dry grinding of large crystals of unrefined carbazole dioxazine crude in an oscilating mill, followed by treatment of the milled materials with solvents containing surfactants and weak acids to produce C.I. Pigment Violet 23. In EP 075,182, the carbazole dioxazine crude is treated with polyphosphoric acid followed by drowning into water, ice and/or a water miscible organic liquid to produce C.I. Pigment Violet 23. U.S. Pat. No. 4,804,417 discloses pigment-grade dioxazine violet produced from crude material by converting to the sulphate followed by hydrolysis and treatment with alcohol and inorganic salt. The processed pigment has a cleaner hue, greater color strength, good dispersibility, smaller particle size (less than 0.5 μm) than the crude material and a specific surface area over 25 $m^2/g$.

Prior to the present invention, it was believed in the art that the carbazole dioxazine crude had little coloring value on its own and was useful only as an intermediate for the production of C.I. Pigment Violet 23. The present process utilizes carbazole dioxazine crude directly as a pigment in order to generate unique color effects, without processing the carbazole dioxazine crude into C.I. Pigment Violet 23. Thus, the present invention relates to the discovery of a new utility for carbazole dioxazine crude; its use as a pigment to produce new color effects.

DETAILED DESCRIPTION OF THE INVENTION

This invention relates to the surprising discovery that carbazole dioxazine crude, having a specific surface area of 2 to 20 $m^2/g$, as determined by the BET method, and an average particle size of 0.5 to 20 μm, as determined by scanning electron microscopy, is useful as a pigment for coloring high molecular weight organic materials. Thus, the present invention relates to a process for coloring high molecular weight organic materials which comprises incorporating carbazole dioxazine crude, having a specific surface area of 2 to 20 $m^2/g$, preferably 3 to 10 $m^2/g$, and an average particle size of 0.5 to 20 μm, preferably 1 to 15 μm, into a high molecular weight organic material.

The larger particle size of the carbazole dioxazine crude utilized in the present process produces unique color effects, for example, multicolor and shimmering effects, when the pigment is incorporated into high molecular weight organic materials. Additionally, carbazole dioxazine crude, with the specified surface area and particle size, manifests a unique infrared reflection spectra with reflection in the region above 670 nm. This makes the carbazole dioxazine crude especially suitable for use as a green organic pigment in camouflage applications.

Carbazole dioxazine crude is produced according to methods known in the art by condensing amino-ethylcarbazole with chloranil in a high-boiling solvent (such as o-dichlorobenzene) followed by ring closure using an agent such as benzene sulfonylchloride to yield needle to flaky pigment forms of very large particle size (up to 30 μm). Carbazole dioxazine crude with more flaky-like pigment particles is preferred for use in the present process.

It is known in the art that organic pigments having very large particle size can cause gloss problems when applied in automotive paints. It is also known that large particle size organic pigments tend to break down when incorporated into plastic media, causing different hues and color strength depending on the applied shear forces. Thus, in order to be useful in the present applications, the carbazole dioxazine crude pigment must have a specific surface area in the range 2 to 20 $m^2/g$, preferably 3 to 10 $m^2/g$ and an average particle size in the range from 0.5 to 20 μm, preferably 1 to 15 μm. Most preferably, the carbazole dioxazine crude will have a specific surface area of from 3 to 10 $m^2/g$ and an average particle size of from 1 to 15 μm.

Since carbazole dioxazine crude prepared by known methods often contains some particles with a size greater than 20 μm, it is usually subjected to some treatment in order to obtain a pigment form with the above indicated surface area and average particle size characteristics. However, carbazole dioxazine crude with the desired properties is also prepared by modification of the preparatory process, for example, by modification of the synthetic end-step. Therefore, the present process will generally, but not necessarily, include a step wherein the carbazole dioxazine crude is treated to obtain a pigment form with the desired surface area and particle size characteristics.

An optimized pigment form of carbazole dioxazine crude, which has the desired specific surface area and average particle size for use in the present process, is preferably obtained by micropulverization of the carbazole dioxazine crude. Micropulverization is well known in pigment technology and is mainly used for the pulverization and deaggregation of dried pigment presscakes to obtain fine, easily applicable pigment powders. Since only very large pigment particles and aggregates need to be reduced in size in order for the carbazole dioxazine crude to be useful in the present process, a more selective process such as micropulverization is superior to dry ballmilling, dry grinding, kneading or wet milling.

A number of commercially available micropulverization apparatus are useful for preparing the carbazole dioxazine crude for use in the present applications. Air jet pulverizers and hammer mills are particularly useful for producing the characteristics desired for the present applications.

According to the present invention, new and unique multicolor effects are created by incorporating carbazole dioxazine crude pigment, which has the desired specific surface area and average particle size, into a high molecular weight organic material. The multicolor effects can be varied by applying the carbazole dioxazine crude pigment in a mixture with other appropriate pigments or dyes, or, by varying the substrate.

Multicolor effects are well known in the pigmenting art. Generally, if a multicolor effect is present, the viewer will observe different color shades or hues when viewing an object from different viewing angles. Thus, depending on the viewing angle, the viewer may see, for example, a green shade and a blue shade. The term "flop" is generally used to describe the different color shades or hues. For example, the expression "green with a blue flop" means that the color changes from green to blue, or vice versa, depending on the viewing angle. Multicolor efects are highly desireable in certain applications, for example, in automotive coatings.

The pigmented, high molecular weight organic materials, which are colored according to the present process, are useful in a variety of applications. For example, the high molecular weight organic material can be converted into casted and molded articles, or it can be used for the pigmentation of lacquers and enamel coating compositions. The pigmented, high molecular weight organic materials prepared according to the present invention are particularly useful for preparing automotive coating paints.

The high molecular weight organic materials which can be colored according to the present process and processed into casted and molded articles are, for example, thermoplastics, thermoset plastics or elastomers which can be processed to molded articles. Examples of these types of high molecular weight organic materials include cellulose ethers, cellulose esters such as ethyl cellulose, linear or crosslinked polyurethanes, linear, cross-linked or unsaturated polyesters, polycarbonates, polyolefins such as polyethylene, polypropylene, polybutylene and poly-4-methylpent-1-ene, polystyrene, polysulfones, polyamides, polycyclamides, polyimides, polyethers, polyether ketones such as polyphenylene oxides, poly-p-xylylene, polyvinylhalides such as polyvinyl chloride, polyvinylidene chloride or fluoride and polytetrafluoroethylene, polyacrylonitrile, acrylic polymers, polyacrylates, polymethacrylates, rubber, silicone polymers, phenol/formaldehyde resins, epoxy resins, styrene-butadiene rubber, acrylonitrile-butadiene rubber or chloroprene rubber singly or in mixtures.

High molecular weight organic materials, which are useful for heat-curable coatings or cross-linking, chemically-reactive coatings, are also colored according to the present process. The pigmented, high molecular weight organic materials prepared according to the present process are especially useful in stoving finishes which contain the customary binders and which are reactive at high temperature. Examples of the pigmented, high molecular weight organic materials which can be used in coatings, include acrylic alkyd, epoxy, phenolic, melamine, urea, polyester, polyurethane, blocked isocyanate, benzoguanamine or cellulose ester resins, or combinations thereof. The pigmented, high molecular weight organic materials prepared according to the present process, are also useful as air drying or physically drying coatings, for example, conventional lacquers such as those used in the cosmetics industry as nail varnishes, for example nitrocellulose lacquers.

The present process is particularly suitable for producing multicolor effects in coatings conventionally employed in the automobile industry, especially in acrylic/melamine resin, alkyd/melamine resin or thermoplastic acrylic resin systems, as well as in aqueous based coating systems.

The high molecular weight organic materials are colored individually or in mixtures as plastic materials, melts or in form of spinning solutions, lacquers, paints as well as aqueous paints or printing inks. Depending on the intended use, it is found to be advantageous to use the carbazole dioxazine crude according to the invention as a toner or in the form of formulated preparations.

Compositions comprising the high molecular weight organic material and the carbazole dioxazine crude, will generally contain from 0.01 to about 30 percent by weight, preferably 0.1 to 10 percent by weight, of the carbazole dioxazine crude.

The high molecular weight organic material is colored according to the present process by mixing carbazole dioxazine crude pigment with the high molecular weight organic material, for example, in the form of a masterbatch, using roll mills or a mixing or grinding apparatus. The pigmented material is then brought into the desired final form by methods such as calendering, pressing, extruding, brushing, casting or injection molding. To produce non-rigid moldings or to reduce their brittlenes, it is frequently desirable to incorporate plasticizers into the high molecular weight compounds before the shaping operation. Suitable plasticizers are, for example, esters of phosphoric acid, phthalic acid or sebacic acid. Plasticizers can be incorporated into the polymers either before or after the incorporation of the carbazole dioxazine crude pigment.

Transparent plastics, such as flexible PVC, show a reflectance color of shimmering green and a strong reddish blue transmittance color when they are colored according to the present process. The color effect is varied as a function of the polymer in which the carbazole dioxazine crude pigment is dispersed and the conditions by which the pigment is incorporated.

The carbazole dioxazine crude pigment used in the present process has proven particularly useful as a new stir-in effect pigment in water or solventborne automotive coating systems. The pigment displays a new unique greenish color effect shade when utilized for this application.

In addition to the effects described above, new unique color effect shades can be obtained by coloring high molecular weight organic material with the carbazole dioxazine crude pigment in admixture with other organic and/or inorganic pigments and/or polymer soluble dyes. Particularly interesting multicolor shades are created when the high molecular weight organic material is colored with carbazole dioxazine crude pigment in combination with other "effect" pigments such as pearlescent pigments or graphite and metallic pigments such as aluminum flakes. The pigment of the present invention is also suitable for producing effect finishes by itself.

Examples of suitable organic pigments are: azo, azomethine, methine, anthraquinone, phthalocyanine, perinone, perylene, dioxazine, diketopyrrolopyrrole, thioindigo, iminoisoindoline, iminoisoindolininone, quinacridone, quinacridonequinone, flavanthrone, indanthrone, anthrapyrimidine or quinophthalone pigments, and also metal complexes of, for example, azo, azomethine or methine pigments. Pigments having good heat resistance and high transparency are especially suitable. Preferred organic pigments are phthalocyanines, anthraquinones, perylenes, diketopyrrolopyrroles, iminoisoindolinones, quinacridones, indanthrones and disazo pigments.

Examples of suitable inorganic pigments are metal oxides such as iron oxide, antimony yellow, bismuth vanadate, lead chromates, lead chromate sulfates, lead molybdates, ultramarine blue, cobalt blue, manganese blue, chrome oxide green, hydrated chrome oxide green, cobalt green, and also metal sulfides such as cadmium sulfide, zinc sulfide, antimony trisulfide and cadmium sulfoselenides. Examples of preferred inorganic pigments are lead chromates, lead chromate sulfates, lead molybdates and iron oxides.

Examples of suitable polymer soluble dyes are anthraquinone- or phthalocyanine-based dyes or metal complexes of azo dyes, as well as fluorescent dyes such as those of the coumarin, naphthalimide, pyrazoline, acridine, xanthene, thioxanthene, oxazine, thiazine or benzthiazole series.

Examples of suitable pearlescent pigments are natural and synthetic pearlescent pigments such as the silvery-white pearlescent pigments, for example, the so-called natural "fish scale" pigments or, as synthetic pearlescent pigments, basic lead carbonate, bismuth oxychloride, bismuth oxychloride on carrier and, in particular, the titanium dioxide-coated mica pigments. These pearlescent pigments may also contain other colored metal oxides such as iron oxide, cobalt oxide, manganese oxide or chromium oxide.

Examples of other effect pigments are graphite and molybdenum disulfide in an optimized platelet pigment form as described in U.S. Pat. Nos. 4,517,320 and 5,063,258.

Due to its high opacity and reflectance, the carbazole dioxazine crude pigment according to this invention is ideally suited for use in mixtures with known transparent titanium dioxide-coated mica pigments for the generation of new multicolored styling shades in automotive finishes and plastics. The color effect and shade can be varied by varying the kind of the pearlescent pigment and the pigment concentrations. For example, a suitable unique blue shade effect color with a strong greenish flop can be obtained, as described in Example 4.

In order to achieve maximum color effect, the carbazole dioxazine crude pigment according to this invention is preferably added as the final component when applied in automotive paints. Thus, the present process also has the advantage that the carbazole dioxazine crude pigment can be used directly as a stir-in pigment, making expensive dispersion expenditure in bead-mills or three-roll-mills unnecessary.

Due to the larger particle size of the carbazole dioxazine crude pigment the present process is also very suitable for coloring high performance plastics. High performance plastics, which are colored according to the present process, display excellent heat resistance.

Materials colored by the present process display excellent lightfastness and fastness to weathering. Furthermore, the carbazole dioxazine crude pigment is readily incorporated into the organic matrix, providing homogenous effect colorations with color strength, saturation and high opacity.

The following examples further describe the embodiments of the instant invention. In these examples, all parts given are by weight unless otherwise indicated.

EXAMPLE 1A 100 grams carbazole dioxazine Sumitone Fast Violet RL Base from SUMITOMO is micropulverized in an assemble micropulverizer The Bantam, type G-90 from American Marietta Company, using a 0.094 inch round hole screen yielding a carbazole dioxazine pigment having a spec. surface area of 4.5 $m^2/g$ and an average pigment particle size of 2 to 20 $\mu m$ determined by scanning electron microscopy.

EXAMPLE 1B 1.6 grams of the carbazole dioxazine obtained according Example 1A are predispersed in 2.4 grams epoxidized soybean oil type G-62 from ROHM & HAAS by mixing it with a spatula.

153.2 grams clear master batch medium hard polyvinyl-chloride POLYFLEX from DAYON (Ohio) are rolled on a two-roll calendar at 292° F.-298° F. by constant folding, removal and feeding. 2.5 grams of the above described pigment/soybean dispersion are added into the rolling hot PVC sheet and the sheet is rolled another ten times by constant folding, removal and feeding. The resulting medium hard PVC sheet is colored with a unique strong silky green shade which surprisingly shows a strong reddish blue transmittance color. The medium hard PVC sheet produced has outstanding lightfastness properties.

EXAMPLE 2A 100 grams carbazole dioxazine SANDORIN Violet BL crude dry salt free from SANDOZ is micropulverized in a micropulverizer as described in Example 1A using a 0.047 inch round hole screen instead of a 0.094 inch round hole screen to a carbazole dioxazine pigment having a specific surface area of 5.2 $m^2/g$. A scanning electron micrograph displays pigment particles with a flake-like shape and an average particle size of 2-10 $\mu m$.

EXAMPLE 2B

This example illustrates the incorporation of the carbazole dioxazine crude pigment into a high solid enamel coating:

PIGMENT DISPERSION FORMULATION 24 grams of the carbazole dioxazine pigment prepared according to Example 2A is introduced into a 1 pint can followed by 68.6 grams of acrylic resin and 57.5 grams of xylene. The mixture is agitated moderately with an impeller stirrer. The dispersion contains 16% pigment and 48% solids at a pigment to binder ratio of 0.5.

CATALYST AND STABILIZER SOLUTION FORMATION 855 grams of ethyl acetate, 2039 grams UV-screener solution (contains benzotriazol UV absorber TINUVIN 1130 from CIBA-GEIGY Corp.) and 33 grams of an amine solution (n-propylamine in xylene, methanol, butanol) are mixed with an impeller stirrer in a gallon jar. A mixture of 47.0 grams methanol and 156 grams dodecyl benzenesulfonic acid is added and the resulting solution is stirred for 20 minutes.

PAINT FORMULATION 33.4 grams of above described pigment dispersion, 38.2 grams of acrylic resin, 27.0 grams of melamine resin and 28.9 grams of catalyst and stabilizer solution are mixed and diluted with xylene to a spray viscosity of 13-17 seconds using a No. 4 FORD cup. The paint (masstone) is sprayed onto a primed aluminum panel which is then exposed to ambient air for 10 minutes and stoved for 30 minutes at 130° C.

A unique silky shimmering green coating, which has excellent weatherfastness properties, is obtained.

Examples 3A and 4 illustrate pigmenting a base clearcoat automotive paint according to this invention.

EXAMPLE 3A

Pigment Dispersion 80.0 grams RK-3868 (NAD-resin from DU PONT), 17.6 grams RK-3765 dispersant-resin from DU PONT and 70.4 grams SOLVESSO 100 from American Chemical are introduced into a 1 pint can. 32.0 grams carbazole dioxazine obtained according to Example 2A are mixed in as a stir-in pigment by moderate stirring with an impeller stirrer. The dispersion contains 16.0% pigment and 48.0% solids at a pigment to binder ratio of 0.5.

Stabilized Resin Solution 144.6 grams of xylene, 90.0 grams methanol, 1353.0 grams RK-3868 (NAD-resin from DU PONT), 786.2 grams CYMEL 1168 (melamine resin from American Chemical), 65.6 grams VM-1619 (UV-screener solution from DU PONT), 471.6 grams RK-3869 (acrylourethane resin from DU PONT) and 89.0 grams VM-1592 (catalyst solution from DU PONT) are mixed with an impeller stirrer in a gallon jar.

Mica Formulation 251.1 grams Exterior Mearlin Bright White 139X, a transparent titanium dioxide coated mica pigment from the MEARL Corp. followed by 315.0 grams RK-3868 (NAD-resin from DU PONT) and 180.0 grams RK-3869 (acrylourethane resin from DU PONT) are mixed in a glass container. The mica formulation contains 27.9% mica pigment and 57.3% solids at a pigment to binder ratio of 0.5.

Paint Formulation (50 parts pigment/50 parts mica)

28.7 grams of the above described pigment dispersion, 16.5 grams of the above described mica formulation, 6.1 grams RK-3869 (acrylourethane resin from DU PONT), 3.5 grams RK-3868 (NAD resin from DU PONT) and 70.2 grams of the above described stabilized resin solution are mixed and sprayed onto a primed aluminum panel followed by spraying a RK-3953 clearcoat resin from DU PONT onto the colored basecoat. The panel is exposed to ambient air for 10 minutes and stoved for 30 minutes at 130° C. A unique bluish shade colored coating is obtained displaying a strong metallic appearance of color depth and color travel effect with excellent weatherability.

EXAMPLE 3B (COMPARATIVE EXAMPLE)

The procedure of Example 3A is repeated except that the above pigment dispersion is replaced by a pigment dispersion which contains 16% of the commercial carbazole dioxazine, C.I. Pigment Violet 23, HOSTAPERM Violet RL from HOECHST, which has been ballmilled for 64 hours and which has a specific surface area of about 80 m$^2$/g. A coated panel with a strong violet color is produced.

EXAMPLE 4

The procedure of Example 3a is repeated using a 75 parts pigment: 25 parts mica paint formulation. Thus, 46.3 grams pigment dispersion and 6.4 grams mica formulation are used instead of 28.7 grams and 16.5 grams, respectively. The result is a unique metallic bluish coating with a strong greenish flop depending on the viewing angle. The coating shows an outstanding weatherability.

Examples 5 and 6 illustrate the pigmenting of high performance plastics.

EXAMPLE 5

A mixture of 100 grams MOPLEN S50G polypropylene granules (MONTEDISON) and 1.0 gram of carbazole dioxazine crude pigment obtained according Example 2B are blended for 15 minutes in a glass bottle on a roller gear bed. Extrusion of the mixture into a ribbon in a laboratory extruder produces a ribbon colored in a uniform strong greenish color of excellent light and heat fastness.

EXAMPLE 6

The procedure of Example 5 is repeated using DEGALAN 7 polymethacrylate granules (DEGUSSA) to yield a ribbon having a uniform greenish color with excellent fastness properties.

In addition to the embodiments described herein, numerous variations of these embodiments can be made in accordance with this invention.

What is claimed is:

1. A process for coloring a high molecular weight organic material which comprises incorporating an effective pigmenting amount of carbazole dioxazine crude pigment having a specific surface area of from about 2 to 20 m$^2$/g and an average particle size of 0.5 to 20 μm, into the high molecular weight organic material.

2. A process of claim 1, wherein said specific surface area ranges from 3 to 10 m$^2$/g.

3. A process of claim 1, wherein said average particle size ranges from 1 to 15 μm.

4. A process of claim 1, wherein said carbazole dioxazine crude is micropulverized prior to incorporating into said high molecular weight organic materials.

5. A process of claim 1, wherein said high molecular weight organic material is a high-performance plastic is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoro-ethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

6. A process of claim 1, wherein said high molecular weight organic material is a coating comprises a resin component selected from the group consisting of acrylic, alkyd, epoxy, phenolic, melamine, urea, polyester, polyurethane, blocked isocyanate, benzoguanamine and cellulose ester resins, and mixtures thereof.

7. A process of claim 1 wherein a multicolor effect or a camouflage effect is produced.

8. A process of claim 3 wherein a multicolor effect or a camouflage effect is produced.

9. A composition comprising a high molecular weight organic material and from 0.01 to about 30 percent by weight of carbazole dioxazine crude having a specific surface area of 2 to 20 m$^2$/g and an average particle size of 0.5 to 20 μm.

10. A composition of claim 9, which further comprises from 0.01 to about 30 percent by weight of a coloring component selected from the group consisting of an organic pigment other than carbazole dioxazine crude, a polymer-soluble organic dye and an effect pigment.

11. A composition of claim 10, wherein the coloring component is a pigment selected from the group consisting of azo, azomethine, methine, anthraquinone, phthalocyanine, perinone, perylene, dioxazine, diketopyrrolopyrrole, thioindigo, iminoisoindoline, iminoisoindolinone, quinacridone, quinacridonequinone, flavanthrone, indanthrone, anthrapyrimidine and quinophthalone pigments.

12. A composition of claim 10, wherein the coloring component is a water-soluble organic dye selected from the group consisting of metal complexes of azo, azomethine and methine dyes.

13. A composition of claim 10, wherein the coloring component is an effect pigment selected from the group consisting of aluminum, graphite, molybdenumdisulfide and pearlescent pigments.

14. A composition of claim 10, wherein the coloring component is a titanium dioxide-coated mica effect pigment.

15. A composition of claim 14, which further comprises a colored metal oxide selected from the group consisting of iron oxide, cobalt oxide, manganese oxide and chromium oxide.

16. A composition of claim 9, wherein the high molecular weight organic material is a high performance plastic selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins and diene rubbers or copolymers thereof.

17. A composition of claim 9, wherein the high molecular weight organic material is a coating which comprises a resin component selected from the group consisting of acrylic, alkyd, epoxy, phenolic, melamine, urea, polyester, polyurethane, blocked isocyanate, benzoguanamine and cellulose ester resins or mixtures thereof.

* * * * *